Patented Sept. 4, 1951

2,566,814

UNITED STATES PATENT OFFICE 2,566,814

COLORED PHOTOGRAPHIC LAYERS AND THEIR MANUFACTURE

André Emile Van Dormael, Heverlee-Louvain, and Laurent Aloys Van Der Auwera, Mortsel-Antwerp, Belgium, assignors to Gevaert Photo-Producten N. V., Mortsel-Antwerp, Belgium, a company of Belgium No Drawing. Application September 23, 1947, Serial No. 775,742. In Great Britain September 27, 1946

4 Claims. (Cl. 95—8)

This invention relates to colored photographic layers, especially of anti-halation and filter layers and to the manufacture thereof.

It is already known to prepare such layers by the use of oxonole dyestuffs of the Formula I:

I 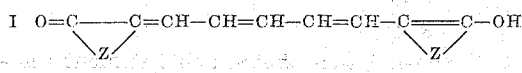

wherein

Z=the atoms required for completing a cyclic radical.

These dyestuffs were prepared by the condensation of glutacondialdehyde-dianilide with a compound according to Formula II:

II 

in alkaline medium, for instance in the presence of triethylamine.

It is further known to prepare anti-halation- or filter layers by the use of dyestuffs as represented by the foregoing formulae with this particularity that the two carbon atoms of the polymethine chain are linked over an external bridge consisting of at least two carbon or nitrogen atoms or one carbon and one nitrogen atom.

These dyestuffs are prepared by the condensation of a five- or six-membered cyclic compound containing a reactive methylene group linked with a carbonyl group as members of the nucleus with products corresponding to the following Formulae III and IV:

III 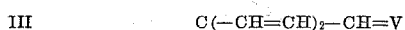

or
IV 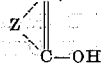

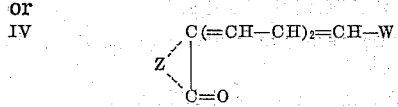

wherein

V=O, N—aryl, (—O—alkyl)₂,

W=—OH, —ONa, —O—alkyl, O—CO—alkyl, —O—CO—aryl, a substituted amino group or halogen, and two carbon atoms of the polymethine chain are linked by an external bridge, or

wherein W and V have the same significance and two carbon atoms of the polymethine chain may be linked in the same way, or

W=CH—V wherein W and V still have the same significance.

Oxonol-dyestuffs according to the above Formula I wherein an OH substitution is present in the chain, are not known up to the present.

Indeed, the condensation of compounds according to the above Formula I cannot be carried out with beta-hydroxy-glutacondialdehydedianilide in the normal alkaline medium.

It is an object of the present invention to provide a new process for the manufacture of photographic layers, especially anti-halation- and filter layers.

Another object of the present invention is to provide new colored photographic layers.

Still a further object of the present invention is to provide photographic material containing a colored layer according to this invention.

Further objects will appear from the following description.

Now we have found that very good colored photographic layers, especially anti-halation- or filter layers may be obtained by coating a photographic support or layer with an acid solution of compounds of the Formulae II and V:

II 

V 

wherein

R=—H, —alkyl, aryl or the same substituted,

X=an acid residue,

Ar=aryl,

Z=the atoms required for completing a cyclic radical.

The reaction of compounds according to the above Formulae II and V yields compounds of the following Formula VI:

VI 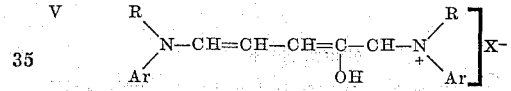

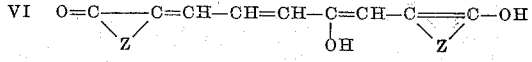

Compounds according to the above Formula V are obtained by reaction of primary and secondary amines with furfurol, as known in the literature. In practice an acid solution may be used of a compound according to Formula II, an aromatic amine and furfurol.

The colored photographic layers obtained according to the present invention are much cheaper to produce than the colored layers containing a dyestuff according to the above Formula I. Known anti-halation and filter dyestuffs may be added to the solution used for coating our new colored photographic layers. Said solution may be incorporated in a colloid layer or to said solution may be added a colloid binder or it may be coated or spread without the assistance of a colloid binder.

The following examples are given to illustrate the present invention without, however, limiting its scope.

Example 1

5 g. furfurol are mixed up with 14 g. anthranilic acid in 200 cm.³ alcohol and with 35 cm.³ 10% alcoholic hydrobromic acid. Next, this solution is treated with 17 g. 1-phenyl-3-methyl-5-pyrazolone in 170 cm.³ alcohol. After spreading upon a glass plate, an intense blue anti-halation layer with adequate lacquer properties is obtained. The probable formula is Formula VII:

VII
$$O=C\text{-----}C=CH\text{-}CH=CH\text{-}C(OH)=CH\text{-}C\text{===}C\text{-}OH$$
(with $C_6H_5-N$, $C-CH_3$, $N$ ring on left; $CH_3-C$, $N-C_6H_5$, $N$ ring on right)

Example 2

5 g. furfurol are mixed up with 9 g. analine in 150 cm.³ alcohol and with 14 g. methylene-disalicylic acid in 140 cm.³ alcohol. Next, this solution is treated with 17 g. 1-phenyl-3-methyl-5-pyrazolone in 170 cm.³ alcohol. After spreading upon the back of a photographic material, a blue colored layer is obtained. The probable formula is the same as in Example 1.

Example 3

5 g. furfurol are mixed up with 14 g. anthranilic acid in 200 cm.³ alcohol and with 14 g. methylene-disalicylic acid in 140 cm.³ alcohol. Next, this solution is treated with 14.5 g. thiobarbituric acid in 145 cm.³ alcohol. After spreading upon a glass plate, a red-violet anti-halation layer with adequate lacquer properties is obtained. The probable formula is Formula VIII:

VIII
$$O=C\text{-}C=CH\text{-}CH=CH\text{-}C(OH)=CH\text{-}C=C\text{-}OH$$
(with $HN$, $C=O$, $C-N$, $S$, $H$ ring on left; $O=C$, $NH$, $N-C$, $H$, $S$ ring on right)

Example 4

5 g. furfurol are mixed with 14 g. anthranilic acid in 200 cm.³ alcohol and with 14 g. methylene disalicylic acid in 140 cm.³ alcohol. Next, this solution is treated with 11.5 g. thiohydantoine in 120 cm.³ alcohol. After spreading upon a glass plate, an intense violet anti-halation layer with adequate lacquer properties is obtained. The probable formula is Formula IX:

IX
$$O=C\text{-----}C=CH\text{-}CH=CH\text{-}C=C=CH\text{-}C\text{===}C\text{-}OH$$
(with $HN$, $NH$, $C$, $S$ ring on left; $OH$; $HN$, $NH$, $C$, $S$ ring on right)

Example 5

10 g. furfurol are mixed with 21 g. N-methyl-aniline, in 150 cm.³ alcohol and with 29 g. methylenedisalicylic acid in 300 cm.³ alcohol. Next, this solution is treated with 36 g. 1-phenyl-3-methyl-pyrazolone-5 in 350 cm.³ alcohol. After spreading upon a glass plate, the same anti-halation layer as in Example 1 is obtained.

What we claim is:

1. A non-halation photographic element comprising a glass support, a light-sensitive silver halide emulsion layer on one face thereof, and a layer on the other face of said support, the latter layer consisting of the dyestuff according to the formula:

$$O=C\text{-----}C=CH\text{-}CH=CH\text{-}C(OH)=CH\text{-}C\text{===}C\text{-}OH$$
(with $C_6H_5-N$, $C-CH_3$, $N$ ring on left; $CH_3-C$, $N-C_6H_5$, $N$ ring on right)

2. A non-halation photographic element comprising a glass support, a light-sensitive silver halide emulsion layer on one face thereof, and a layer on the other face of said support, the latter layer consisting of the dyestuff according to the formula:

$$O=C\text{-}C=CH\text{-}CH=CH\text{-}C(OH)=CH\text{-}C=C\text{-}OH$$
(with $HN$, $C=O$, $C-N$, $S$, $H$ ring on left; $O=C$, $NH$, $N-C$, $H$, $S$ ring on right)

3. A non-halation photographic element comprising a glass support, a light-sensitive silver halide emulsion layer on one face thereof, and a layer on the other face of said support, the latter layer consisting of the dyestuff according to the formula:

$$O=C\text{-----}C=CH\text{-}CH=CH\text{-}C=CH\text{-}C\text{===}C\text{-}OH$$
(with $HN$, $NH$, $C$, $S$ ring on left; $OH$; $HN$, $NH$, $C$, $S$ ring on right)

4. A non-halation photographic element comprising a glass support, a light-sensitive silver halide emulsion layer on one face thereof, and a layer on the other face of said support, the latter layer consisting of a dyestuff according to the general formula:

$$O=C\text{-----}C=CH\text{-}CH=CH\text{-}C=CH\text{-}C\text{===}C\text{-}OH$$
(with $Z$ ring on left; $OH$; $Z$ ring on right)

wherein Z represents the atoms necessary to complete a member selected from the group consisting of a five- and six-membered cyclic radical, said atoms being chosen so that they activate the $CH_2$ group when they are present in the compound $$CH_2\text{-}C=O$$
(with $Z$ ring)

ANDRÉ EMILE VAN DORMAEL.
LAURENT ALOYS VAN DER AUWERA.

REFERENCES CITED

The following references are of record in the file of this patent:

UNITED STATES PATENTS

| Number | Name | Date |
|---|---|---|
| 1,631,421 | Lohofer | June 7, 1927 |
| 1,900,459 | Moyse | Mar. 7, 1933 |
| 1,939,171 | Hickman | Dec. 12, 1933 |
| 2,089,764 | Schneider | Aug. 10, 1937 |
| 2,158,287 | Konig | May 16, 1939 |
| 2,165,337 | Brooker | July 11, 1939 |
| 2,274,782 | Gaspar | Mar. 3, 1940 |
| 2,199,542 | Konig | May 7, 1940 |
| 2,258,609 | Hill | Oct. 14, 1941 |
| 2,322,006 | Fierke et al. | June 15, 1943 |